June 27, 1961 L. E. LONG 2,990,294
PRIMER COATING COMPOSITIONS
Filed Feb. 25, 1957
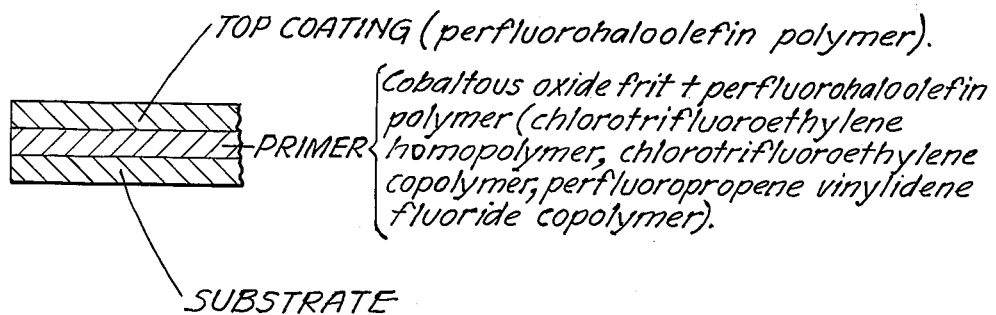
INVENTER
LAMAR E. LONG
BY
Carpenter, Abbott, Coulter & Kinney
ATTORNEYS

United States Patent Office

2,990,294
PRIMER COATING COMPOSITIONS

Lamar E. Long, Doylestown, Pa., assignor, by mesne assignments, to Minnesota Mining and Manufacturing Company, St. Paul, Minn., a corporation of Delaware
Filed Feb. 25, 1957, Ser. No. 641,839
19 Claims. (Cl. 117—75)

This invention relates to a primer coating composition comprising a mixture of a halogen-containing polymer and a metal oxide frit. In one aspect this invention relates to a primer coating composition comprising a mixture of a polymer of a halogen-containing olefin and a metal oxide frit. In another aspect this invention relates to perfluorohaloolefin polymer composition which has improved adhesive characteristics. In another aspect the invention relates to chemically resistant coatings. Another aspect of the invention relates to chemically resistant laminates. Still another aspect of this invention relates to a method of preparing halogenated thermoplastic compositions having good adhesive characteristics and chemical resistance.

There is a widespread demand in industry for protective coatings which will withstand the effects of severe environmental conditions. Many protective coatings are currently available but these are useful only where high temperature and highly corrosive materials are not encountered.

Recent industrial developments have made available at high molecular weight, fluorinated olefin polymers. These fluorinated olefin polymers, for example, polymers of chlorotrifluoroethylene, have a unique combination of physical and chemical characteristics which has led to their use in a variety of applications. Physically, these polymers which are flexible at low temperatures and extremely tough possess high thermal stability and excellent electrical properties and are, therefore, widely used as electrical insulation particularly in situations where high temperatures are expected. Chemically, these polymers offer excellent resistance to highly corrosive chemicals, such as fuming nitric acid, solvents such as aniline, acetone, alkalies, such as sodium hydroxide, etc., and are therefore widely used where corrosive environment conditions are anticipated. Although the highly fluorinated olefin polymers as a group possess desirable physical and chemical characteristics, such as, in addition to those mentioned above, low permeability, zero moisture absorption, high abrasive resistance, high tensile strength, high impact strength, etc., their adhesive characteristics are poor, particularly their adhesion to metal surfaces. Therefore, it has been necessary to utilize various techniques in order to provide adhesion. For example, by one method, it is necessary to provide an adhesive coating to the surface and a "mixed" coating containing a major amount of the adhesive and a minor amount of the highly fluorinated polymer before the final coating of highly fluorinated polymer can be applied. Other methods include sand blasting or etching the surface, however, these techniques provide only a mechanical bonding of the polymer to the surface of the substrate, and as a result, the polymeric coating does not have a lasting adherence.

It is, therefore, an object of this invention to provide a primer coating composition which combines good physical and chemical characteristics with lasting adhesive properties.

It is another object of this invention to provide an additive which, when mixed with a halogenated-containing polymer, provides an adherent coating on the surface of a substrate.

It is another object of this invention to provide a primer coating composition to which a final coating of halogenated polymer can be applied directly.

It is another object of this invention to provide an article of manufacture coated with a chemically resistant, thermally stable composition.

Another object of this invention is to provide perfluorohaloolefin polymer-glass cloth laminate for use under severe environmental conditions of temperature and corrosion.

Another object of this invention is to provide a strongly adherent perfluorohaloolefin polymeric coating composition for metal surfaces.

Another object of this invention is to provide a commercially feasible method for preparing a primer coating composition.

Still another object of this invention is to provide a method for applying a chemically resistant coating composition to the surface of a substrate.

Various other objects and advantages of the present invention will become apparent to those skilled in the art from the accompanying description and disclosure.

According to this invention a primer coating composition containing a dispersion vehicle, halogen-containing polymer such as a perfluorohaloolefin polymer, and a metal oxide frit of a metal above group IV of the periodic table having a melting point between about 600° C. and about 1500° C. such as, for example, cobaltous oxide frit; is applied to a substrate such as, for example, a metal substrate, and is fused and cured thereon at a temperature of between about 350° F. and about 600° F.

The halogen-containing polymers in the primer coating composition of the present invention are plastic or elastomeric olefinic polymers, the monomers of which contain between 2 and 5 carbon atoms and at least one normally gaseous halogen atom (chlorine or fluorine) for every two carbon atoms in the olefin monomer. The preferred polymers of the present invention are the polymers of perfluorohaloolefins containing between 2 and 3 carbon atoms in the olefin monomer.

Examples of the preferred perfluorohaloolefin polymers are the homopolymers of chlorotrifluoroethylene, bromotrifluoroethylene and tetrafluoroethylene; the copolymers of any combination of the above perfluorohalogenated olefin monomers and the copolymers of any of the above perfluorohalogenated olefin monomers as well as perfluoropropene with hydrogen-containing halogenated olefins such as vinylidene fluoride, vinyl fluoride, vinylidene chloride, vinyl chloride, trifluoroethylene, chlorofluoroethylene and 1,1,3-trifluorobutadiene.

Most preferred of the above-mentioned polymers are the polymers of chlorotrifluoroethylene, namely, the homopolymer of chlorotrifluoroethylene and the copolymer of chlorotrifluoroethylene and vinylidene fluoride, which copolymer contains not more than 20 mole percent of vinylidene fluoride.

Other halogenated olefin polymers which are usefully employed in the present invention are the homopolymers of vinylidene fluoride, vinylidene chloride, vinyl fluoride, vinyl chloride, trifluoroethylene, chlorofluoroethylene and any polymeric combination of the above-mentioned monomers.

High molecular weight plastics or elastomers of the above-mentioned polymers having molecular weights above 50,000 are those which are preferably employed in this invention as distinct from low molecular weight polymers of the same monomers which exist in oil, grease and wax range. In applications of putties and caulking fluids, these lower molecular weight polymers may be employed. The high molecular weight polymers referred to are normally solid and have softening points above 150° C. and, in the case of homopolymers of chlorotrifluoroethylene, have no strength temperatures (NST) of at least 220° C. and preferably above 250° C. These high molecular weight polymers are employed in the coating compositions and laminates of the present invention.

For the purpose of this invention the preferred copolymer of chlorotrifluoroethylene and vinylidene fluoride contains above about 80 mole percent and below 100 mole percent chlorotrifluoroethylene. Copolymers containing between 70 and 80 mole percent of chlorotrifluoroethylene have resinous characteristics and are soluble in a number of common organic solvents. Copolymers between 20 and 69 mole percent of chlorotrifluoroethylene are elastomeric. The selection of the proper copolymer mole ratio depends on the ultimate use and desired properties of the blend. However, it has been found that for most coating compositions a chlorotrifluoroethylene and vinylidene fluoride copolymer composition containing above 80 mole percent chlorotrifluoroethylene is desirable.

In the process of this invention a dispersion of polymer particles is preferably employed wherein the particle size of the polymer is generally that of a finely divided powder, that is, at least 95 percent through a number 12 sieve, preferably a number 200 sieve in the U.S. Bureau of Standards Series. In the case of a chlorotrifluoroethylene polymer the particle size is most preferably not more than 50 microns.

The primer coating compositions of this invention are applied by techniques which require the presence of a volatile dispersing vehicle which preferably wets the particle surfaces of the halogen-containing polymer and in which the polymer and metal oxide frit is insoluble. However, it is also within the scope of this invention, particularly where the more soluble elastomeric polymers are employed, to prepare a solution of the polymer wherein the metal oxide frit particles are suspended. Examples of volatile dispersing vehicles which may be suitably used in this invention are the aromatic hydrocarbons such as, for example, benzene, toluene, xylene, etc.; aromatic and aliphatic ketones such as, for example, methyl ethyl ketone, diisobutyl ketone, diphenyl ketone, etc., aliphatic esters such as amyl acetate, ethyl acetate, ethyl propionate, and water used in combination with any soluble wetting agent such as, for example, acetone, butanol, pentanol, etc.

The metal oxide frit or primer which is blended with the halogen-containing polymer of this invention is the frit of a metal oxide selected from the group consisting of oxides of antimony, oxides of manganese, oxides of nickel and oxides of cobalt. The metals of these oxides are those metals which have melting points between 600° C. and about 1500° C. and are located in the fifth, seventh and eighth groups of the periodic table. This particular group of metals, above group IV of the periodic table, having a melting point between about 600° C. and about 1500° C., are selected because the oxides of these metals are formed at high temperatures and are capable of fusing with the frit at convenient temperatures and will not decompose or degrade at the temperature of fusion. In this invention a metal oxide constitutes between about 2 weight percent and about 85 weight percent, preferably between about 50 weight percent and about 80 weight percent of the metal oxide frit compound. The metal oxide frit is usually prepared by fusion of the metal oxide and the frit at a temperature above about 1000° C. Some metal oxide frits, for example, cobaltous oxide frit is commercially available and is supplied under that name by Harshaw Chemical Co., The Ferro Corp., and General Metallic Oxide Co., to name a few. For the purposes of this invention a frit is defined as the calcined or partially fused, but yet unvitrified, materials of which glass is made. An example of a typical frit is a complex alkaline borosilicate glass produced by melting a mixture such as borax, feldspar, quartz and cryolite. The frit can be obtained from a number of manufacturers, namely, The O. Hommell Co., Harshaw Chemical Co., J. Pemio Corp. and others.

Of the primers which are suitably blended with the halogen-containing polymer, frits of cobalt oxides, namely cobaltous oxide (CoO), cobaltic oxide ($Co_2O_3$), cobalto-cobaltic oxide ($Co_3O_4$), are most preferred. Examples of other metal oxide frits suitably blended with the haolgen-containing polymers of this invention are the frits of manganic oxide ($Mn_2O_3$), manganous oxide (MnO), permanganate ($Mn_2O_7$), manganite or manganate ($MnO_2$), nickelous oxide (NiO), nickelic oxide ($Ni_2O_3$), nickelous-nickelic oxide ($Ni_3O_4$), nickel peroxides ($NiO_2$ and $NiO_4$), antimony trioxide ($Sb_2O_3$), antimony tetroxide ($Sb_2O_4$) and antimony pentoxide ($Sb_2O_5$). In addition, any combination of the aforementioned metal oxide frits can be used. In certain instances, where it is desirable to fuse the halogen-containing polymer at a higher temperature than is generally used, i.e. at a temperature of about 600° F. or higher, a chromium oxide, a molybdenum oxide and/or a molybdenum sulfide may be added to the metal oxide frit primer to deter degradation of the polymer. Examples of such mixtures are the combination of molybdenum trioxide with cobaltous oxide frit, molybdenum sulfide with cobaltous oxide frit, chromic oxide with cobaltous oxide frit and molybdenum trioxide and chromic oxide with cobaltous oxide frit primer.

The metal oxide frit employed in this process is in a finely divided state or a powder which will pass through a 100 mesh screen and which will preferably pass through a 300 mesh screen in the U.S. Bureau of Standards Series. The particles are dispersed in a volatile organic vehicle or dispersant before or during the time of blending with the halogen-containing polymer and the more finely divided the particle size of the frit, the better the dispersion. Suitable dispersants are the same as those recited above for the halogen-containing polymer.

In preparing the compositions of this invention, between about 5 parts by weight and about 60 parts by weight, preferably between about 20 parts by weight and about 50 parts by weight of the metal frit are blended with each 100 parts by weight of halogen-containing polymer. The polymer to metal oxide frit ratios most preferably employed is between about 3:0.5 and about 3:2. Generally, where maximum chemical resistance is required, the metal oxide frit constitutes a minor proportion of the composition, whereas where maximum bond strength is required, the metal oxide frit constitutes a proportion of the composition approaching 50 percent by weight or more.

The primer coating compositions of the present invention comprising a volatile organic liquid metal oxide frit and halogen-containing polymer are used as coatings on various substrates. These coatings may be applied to metal surfaces, for example, steel, Inconel, Monel, zinc, cadmium, magnesium, brass and aluminum surfaces, to asbestos surfaces, to concrete surfaces, to glass surfaces and to any plastic surface which will withstand high temperatures, for example, temperatures up to about 600° F. without degrading. Examples of such plastic surfaces are a polyurethan surface and a silicone plastic surface. The primer coating compositions can be laid down on the substrate as an initial coat which adheres to the surface and to subsequent coatings of unblended polymer which form a surface coating on top of the initial coat. Examples of some of the applications for this type of coating, are coatings for metal reactors and laminates bonded to suitable fabrics such as glass cloth. The primer coating compositions of this invention, however, can also be applied to a substrate in a desired thickness and used as the sole surface coating. This application is illustrated by the use of chlorotrifluoroethylene polymer blended with cobaltous oxide frit for use as a release coating on tire molds, etc. In cases where the primer coating composition is the only coating applied to a substrate it is generally preferred to employ a perfluorohaloolefin plastic in the primer composition. While the metal oxide frit when present in the final coating decreases the chemical resistance of the coating, still the amount of perfluorohaloolefin plastic used may provide sufficient chemical resistance for the desired application. For some uses such as release coatings, very little chemical resistance may be required. Sometimes only a small amount of metal oxide frit within the lower portion of the above range need be employed in the primer coating composition to give the desired adherence. This is very often the case when applying a coating to a natural or synthetic fabric where the coating permeates the interstices of the woven fibers and is thus mechanically bonded to the fabric. In this instance such a small amount of metal oxide frit need be employed, that its effect on the polymer in the primer coating composition is almost negligible. In cases where the coating material will be exposed to strong chemical action it is preferable to employ the primer coating composition as the initial coat over which a compatible chemically resistant plastic coating is applied. When maximum chemical resistance and bond strength is desired it is most preferred to employ a plastic perfluorohaloolefin polymer which is the same polymer in the primer coating composition as in the subsequent unblended polymeric coatings applied to the substrate. Suitable for this purpose are the plastic polymers of chlorotrifluoroethylene and tetrafluoroethylene.

Although dissimilar polymers may be employed if so desired they must be compatible and it is generally preferred that the halogen-containing polymer in the primer coating composition contains the same amount or less fluorination than the unblended polymeric coatings to be applied thereon. Such a construction is shown in the accompanying figure.

Previous primer coatings have required that a "mixed coat" be applied prior to the application of a final coat. However, when using the blend of the present invention the final unblended coating can be applied directly over the primer coat. This development represents an important chemical and economic advantage over primers previously used. Additional advantages include the strong adhesion to the substrate and to the unblended plastic over-coat, the absence of delamination upon aging, the flexibility, high temperature stability and chemical resistance of these primers over most of those known and used heretofore.

To obtain a fine particle size of the metal oxide frit, the inorganic compound may be dry milled or milled in a volatile vehicle for a period of from 1 to 20 hours, more often for a period of from 2 to 5 hours or until the desired particle size is obtained. The milled frit is then added to the halogen-containing polymer dispersion to provide a dispersion having a total solids concentration of between about 20 and about 80 percent total solids; preferably between about 30 and about 65 percent total solids. Another method of reducing the particle size of metal oxide frit comprises milling the frit after it has been added to the halogen-containing polymer dispersion. In the case of chlorotrifluoroethylene polymer the milled frit can be added to any of the commercially available dispersions of that polymer which are disclosed in U.S. Patents Nos. 2,775,569 and 2,686,767. Any suitable grinding apparatus may be employed for this purpose, for example, a ball mill, a roller mill and a pebble mill.

In addition to the dispersion of the metal oxide frit and halogen-containing polymer, the primer compositions of this invention can contain various additives which are included to alter or improve some of the physical characteristics. For example, plasticizers can be added. Suitable plasticizers include the low molecular weight perfluorochloroolefin polymers, such as the polymers of and telomers of chlorotrifluoroethylene. The low molecular weight homopolymer of chlorotrifluoroethylene ranges from relatively mobile liquids to waxes. One of the preferred low molecular weight telomers of chlorotrifluoroethylene is the homotelomer which has the general formula

$$Cl(CF_2CFCl)_nCl$$

in which $n$ varies from about 4 to about 20. These plasticizers are soluble in the volatile dispersing vehicle and when used, they are added in an amount between about 1 and about 40 parts by weight per 100 parts by weight of the halogen-containing polymer. Although the addition of plasticizers is preferred since it results in more flexible coatings having smooth glossy surfaces, it is not an essential ingredient in the primer coating composition.

Chromic oxide may be added to increase bonding strength of the primer base coat to a metal surface and is used only when extremely high bonding strengths are required. Other bonding aids which can be added to the blend are potassium permanganate, molybdenum sulfide and a polyurethan prepared by the reaction between a polyisocyanate and a polyalcohol. Examples of suitable polyurethans employed for this purpose are the reaction products of diphenylmethanediisocyanate and polyethyleneglycol, toluenediisocyanate and polyethyleneglycol, diphenylmethanediisocyanate and polypropyleneglycol, diphenylmethanediisocyanate and propyleneglycol, and diphenylmethanediisocyanate and propyleneglycol and monoricinoleate.

Additives which stabilize the halogen-containing polymers, particularly the perfluorohaloolefin polymers against the effects of thermal degradation, can also be included in the primer composition of this invention. Such additives include barium peroxide, lead dioxide, chromic oxide, chromic sulfide, cadmium oxide, zinc sulfide, molybdenum trioxide, molybdenum sulfide, stannic oxide and stannic sulfide. When added, the stabilizer constitutes between about 0.1 and about 5 parts by weight per 100 parts by weight of polymer. Inert fillers such as, for example, mica or bentone can also be added to the primer composition in which case, they constitute from 0.1 to 20 parts by weight per 100 parts by weight of polymer. The addition of these fillers aids in the application of primer to a substrate by the method of dipping or slush coating, although the same effect can be accomplished by increasing the solids content in the dispersion, such as by increasing the amount of metal oxide frit and/or polymer in the dispersion.

After the primer coating composition has been prepared and thoroughly mixed, it can be applied to a surface by using a spray, dip, knife or flow coating technique depending upon the viscosity of the dispersion, solution or slurry. After the primer composition has been applied to a substrate by any of the above techniques, it is fused into a continuous adherent film by heating. Fusion temperatures range between about 350° F. and about 600° F., preferably between about 450° F. and about 560° F., for example, 500° F. to 520° F., and are applied for a period of from about a few seconds to about 2 hours, preferably for a period not in excess of about 1 hour. In cases where the primer composition contains a plastic perfluorohaloolefin polymer and no plasticizer, the fusion is effected by heating the primer composition at a temperature above the first order transition temperature of the polymer which is about 220° C. in the case of polychlorotrifluoroethylene. Generally, the higher the fusion temperature, the shorter the residence period of the primer coating composition at that temperature. The residence period is also determined by the method employed for heating. For example, the substrate may be placed in an oven and baked for a period of hours or it may be flame sprayed at a very high temperature (about 600° C.) for a few seconds. Subsequent applications of primer coat may be laid down in the manner stated above allowing each layer to air dry and fusing after each application. When the primer coating composition is to be used as a final coating, layers of the primer coating composition can be laid down up to thicknesses about 25 mils or higher, although coatings of more than about 10 mils generally are not required. When the primer coating composition is employed as an intermediate coating layer, thicknesses of not more than about 6 mils are employed, since at higher thicknesses there is a tendency for the coating to "mud crack."

In both of the above cases a minimum thickness of about 2 mils of the primer coating composition is employed. The primer coating composition may be applied in a series of coating steps or it may be applied in a single step. When used as a base coat or intermediate coat, the outer and final coatings of unblended polymer, i.e. polymer which contains no metal oxide frit, is applied in thicknesses ranging between about 5 and about 25 mils, and preferably between about 8 and about 12 mils.

In a preferred embodiment two applications of the primer coat, wherein each application amounts to about a 2 mil thickness, are laid down on a substrate and fused and about 10 mils of outer coating is applied thereon and cured.

After the final coating of unblended plastic is applied to the surface, the coating is cured thereon at a temperature between about 350° F. and about 600° F., preferably at a temperature between about 450° F. and about 550° F. depending upon the amount of plasticizer present for a period of from about 2 hours to about 25 hours, preferably for a period not exceeding 12 hours.

When fusing or curing the primer coating, the adhesion to a surface may be enhanced by applying pressure to the coated surface. The application of pressures up to about 7,000 p.s.i.g. or higher are at times particularly useful when it is desirable to employ temperatures within the lower portions of the fusing and curing ranges set forth above. When preparing a laminate the use of pressure is preferred since the liquid primer coating, which is forced into the interstices of the fabric, provides a better bond with the fabric.

The finished coating, which is prepared by any of the methods or by the modification of any of the methods set forth above, is strongly adherent to the substrate and can not be peeled, chipped or cracked. The coated portion can be aged in the presence of strong acids or alkalies, at elevated temperatures with no noticeable weakening of the adherent strength. While I do not wish to be bound or limited by any particular theory of operation, it is believed that the metal of the metal oxide frit forms a co-ordination compound with a halogen of the polymer thus providing a chemical bond and that the metal of the metal oxide frit plates out on the substrate, promotes the growth of nodules and provides dendrite growth on the surface of the metal. This theory would account for the exceptional adhesive properties of the primer.

The following examples are offered as a better understanding of the present invention and are not to be construed as unnecessarily limiting thereto.

In each of the following examples where the primer coating compositions were used on steel panels, the steel was degreased and grit blasted before the primer was applied. Detailed information on the preparation of the primer coatings and the application of the coatings is given in Examples 1, 2, 4 and 5. Similar techniques were used in each of the examples reported in the table.

EXAMPLE 1

The following blend was prepared

|  | Weight Percent | Grams |
|---|---|---|
| Non-Volatiles: |  |  |
| Homopolymer of Chlorotrifluoroethylene (NST 310° C.) | 23.9 | 860 |
| CoO Frit obtained from Harshaw chemical Company* | 8.1 | 288 |
| Volatiles: |  |  |
| Chlorotrifluoroethylene 10-200 Wax Plasticizer (20 percent non-volatile—18 hours at 480° F.) | 8.0 | 290 |
| Xylene | 36.0 | 1,297 |
| Diisobutyl ketone | 24.0 | 865 |

*Screen analysis of CoO frit purchased from the Harshaw Chemical Company:

|  | Percent |
|---|---|
| 325 mesh | 58.42 |
| 200 mesh | 19.99 |
| 140 mesh | ----- |
| 120 mesh | ----- |
| Pan (<325 mesh) | 21.59 |
|  | 100.00 |

The above primer coat was prepared by mixing 2880 grams of polychlorotrifluoroethylene dispersion (40 percent by weight of polychlorotrifluoroethylene dispersed in a 50-50 mixture of xylene and diisobutyl ketone) with 288 grams of CoO frit (73.5 percent CoO) in a pebble mill. After milling for 4 hours, 432 grams of xylene was added to readjust the solids to 40 percent.

Two coatings of the above prepared primer coat were applied to steel panels by spraying. After partial air drying, each coat was baked for 45 minutes at 510° F. (substrate temperature). Six coats of commercial NW-25-TR dispersion (a dispersion of polychlorotrifluoroethylene, NST 310° C.) were applied over the primer coat by spraying. After partial air drying, each of the intermediate coats was baked for 45 minutes at 500° F. (substrate temperature) and the sixth coat was baked for five hours and 45 minutes at 500° F. (substrate temperature) after which the panel was quenched in water. The total primer thickness was 4 mils and the total thickness of polychlorotrifluoroethylene was 10 mils as determined with a film thickness gauge.

A panel thus coated was subjected to steam, 240° F. and 10 p.s.i.g., for 100 hours without loss of adhesion. Unprimed polychlorotrifluoroethylene coatings lose adhesion to steel after one hour of similar steam treatment. Another panel thus coated was heat aged in an oven at 300° F. for 100 hours without loss of adhesion.

EXAMPLE 2

| Non-Volatiles | Weight Percent | Grams |
|---|---|---|
| Homopolymer of Chlorotrifluoroethylene (NST 316° C.) | 28.7 | 763 |
| CoO Frit obtained from Harshaw Chemical Company (73.5% CoO) | 9.5 | 253 |
| Copolymer of Chlorotrifluoroethylene 50 mol percent and Vinylidene Fluoride 50 mol percent | 1.3 | 35 |

The above primer was prepared by mixing 3600 grams of polychlorotrifluoroethylene dispersion (30 percent by weight of polychlorotrifluoroethylene dispersed in amyl acetate) with 360 grams of CoO frit (73.5 percent CoO) in a pebble mill for 4 hours. After milling, 360 grams of amyl acetate was decanted to adjust the solids to 40 percent.

A portion of the above dispersion was used to prepare a dip coating primer by decanting 202 grams of amyl acetate and adding 286 grams of copolymer solution (12.2 percent by weight of copolymer in amyl acetate). This primer was thinned with amyl acetate to a Zahn G-2 cup viscosity of 30 seconds. Two coats of primer were then applied to a 0.25 inch steel rod by immersing the rod in the primer, withdrawing slowly and air drying and baking for 45 minutes at 510° F. (substrate temperature) between each coat. Four coats of commercial N-2 dispersion (a dispersion of polychlorotrifluoroethylene and copolymer of chlorotrifluoroethylene and vinylidene fluoride in amyl acetate) were then applied over the primer coating. The N-2 dispersion was thinned to a Zahn G-2 cup viscosity of 20 seconds and the rod was baked for 45 minutes at 500° F. (substrate temperature) after each immersion until the final coat, which was baked for 5.5 hours at 500° F. (substrate temperature), was applied.

The total primer coat thickness was 2.5 mils and the thickness of the total unprimed dispersion was 4 mils as measured with a micrometer. The coated steel rod was subjected to steam, 240° F. and 10 p.s.i.g., for 100 hours without loss of adhesion.

EXAMPLE 3

Two six-inch long, one inch diameter glass reinforced epoxy tubes (constructed of glass cloth and Epon 828 resin cured with metaphenylenediamine catalyst) were dip coated with the primer prepared in Example 2 followed by N-2 dispersion also described in Example 2. The tubes received two coats of primer thinned to a Zahn G-2 cup viscosity of 30 seconds with amyl acetate. Each coat was baked 45 minutes at 510° F. (substrate temperature) before applying the next coat. Three coats of N-2 dispersion thinned to a Zahn G-2 viscosity of 20-26 seconds with amyl acetate were then applied over the primer by dip coating. The two intermediate coats of N-2 dispersion were each baked for 45 minutes at 500° F. (substrate temperature) after applying and the final coat was baked for four hours at 500° F. (substrate temperature). Upon completion of the final bake, the tubes were quenched by immersion in water. It was impossible to strip the primed coating from the tubes.

Similar tubes were dip coated without primer by applying five coats of N-2 dispersion thinned to a Zahn G-2 cup viscosity of 26 seconds with amyl acetate to the tubes. The first two coatings were baked for 45 minutes at 510° F. (substrate temperature) after each application; coats 3 and 4 were baked for 45 minutes at 500° F. (substrate temperature) after each application and the final coat was baked for six hours at 500° F. Upon completion of the final bake, the tubes were quenched by immersion in water. The unprimed coating could be stripped very easily from the tubes.

EXAMPLE 4

|  | Weight Percent | Grams |
| --- | --- | --- |
| Non-Volatiles: |  |  |
| Homopolymer of Chlorotrifluoroethylene (NST 316° C.) | 25.8 | 713 |
| CoO Frit obtained from Harshaw Chemical Company (73.5% CoO) | 13.0 | 359 |
| Copolymer of Chlorotrifluoroethylene 50 mol Percent and Vinylidene Fluoride 50 mol Percent | 1.2 | 32 |
| Volatile Vehicle: |  |  |
| Amyl acetate | 60.0 | 1,657 |

The above primer was prepared by mixing 3240 grams of polychlorotrifluoroethylene dispersion (30 percent by weight of polychlorotrifluoroethylene dispersed in amyl acetate) and 486 grams of CoO frit (73.5 percent CoO) in a pebble mill for 4 hours. After milling, 81 grams of amyl acetate was decanted to adjust solids to 40 percent and 2679 grams of this primer was used to prepare a dip coating primer. Amyl acetate (186 grams) was decanted and copolymer solution, 286 grams (12.2 percent by weight of copolymer in amyl acetate) was added.

The dip coating primer was thinned with amyl acetate to a Zahn G-2 cup viscosity of 32 seconds. Two coats of primer were applied to a 0.25 inch steel rod by immersing the rod in the primer, withdrawing slowly and air drying and baking for 45 minutes at 510° F. (substrate temperature) after each coat. Four coats of commercial N-2 dispersion were then applied over the primer with baking for 45 minutes at 500° F. (substrate temperature) for each of the intermediate coats and baking for 5.5 hours at 500° F. (substrate temperature) for the final coat. The commercial N-2 dispersion used above for coating had been thinned to a Zahn G-2 cup viscosity of 20 seconds before it was applied by dip coating.

The total primer coating thickness was 3.0 mils and the total N-2 dispersion coating thickness was 3.0 mils as measured with a micrometer. The coated steel rod was subjected to steam, 240° F. and 10 p.s.i.g., for 100 hours without loss of adhesion.

EXAMPLE 5

|  | Weight Percent | Grams |
| --- | --- | --- |
| Non-Volatiles: |  |  |
| Homopolymer of Chlorotrifluoroethylene (NST 310° C.) | 25.7 | 864 |
| CoO Frit obtained from Harshaw Chemical Company | 8.7 | 291 |
| Chlorotrifluoroethylene Wax Plasticizer (20% non-volatile—18 hours at 480° F.) | 8.6 | 288 |
| Volatile Vehicle: |  |  |
| Xylene | 28.5 | 956 |
| Diisobutyl ketone | 28.5 | 956 |

A master batch of CoO frit was prepared by milling 2300 grams of CoO frit (73.5 percent CoO) and 1450 grams of volatile vehicle (50 percent xylene and 50 percent diisobutyl ketone) in a one gallon pebble mill for four hours. To a one gallon can was charged 475 grams of the CoO master batch prepared above and 2880 grams of commercial NW-25-TR dispersion (a dispersion of polychlorotrifluoroethylene in xylene and diisobutyl ketone). The ingredients were mixed uniformly by shaking in a paint shaker for one hour.

Two coats of the above prepared primer were applied by spraying onto a steel panel with air drying and baking for 30 minutes at 540° F. (substrate temperature) between each application. Five coats of commercial NW-25-TR dispersion (40 percent by weight of polychlorotrifluoroethylene dispersed in xylene and diisobutyl ketone Zahn G-1 cup viscosity 32 to 34 seconds) were applied over the primer coating by spraying. Each of the intermediate coats was air dried and then baked for 45 minutes at 540° F. (substrate temperature) before applying the next coating. The final coat was baked for seven hours at 540° F. Upon completion of the final bake the steel panel was quenched by immersion in water. Four additional panels were similarly prepared.

One of the coated panels was subjected to steam, 240° F. and 10 p.s.i.g., for 100 hours without loss of adhesion. Other coated panels were subjected to 37 percent hydrochloric acid, 98 percent sulfuric acid, 85 percent phosphoric acid and 50 percent sodium hydroxide for 504 hours at 180° F. without loss of adhesion.

While the above examples illustrate the economy and superiority of chemically resistant coatings while eliminating the necessity for a "mixed coat," it should be noted that "mixed coats" can be used if desired.

The following examples in Table I were carried out using an intermediate coat as a means for introducing stabilizers into the coating compositions which were applied and fused to steel panels. In each case a clean steel panel was coated with primer containing polychlorotrifluoroethylene (NST about 310° C.), cobaltous oxide frit and 50 mol percent vinylidene fluoride-50 mol percent chlorotrifluoroethylene copolymer dispersed in xylene in the manner described in the preceding examples above. The following intermediate coatings were prepared, applied and baked thereon before applying the final coating of commercial NW–25–TR.

*Table I*

|   | Example 6 | Example 7 | Example 8 | Example 9 |
|---|---|---|---|---|
| N-2 [1] Dispersion in Grams | 100 |  |  |  |
| NW-25-TR Dispersion, Grams |  | 100 | 200 | 200 | 200 |
| Xylene, Grams | 10 | 12.5 | 12.5 | 12.5 |
| Mica, Grams | 3 | 3 | 3 | 3 |
| CoO frit, Grams | 3 | 1.5 | 1.5 | 1.5 |
| MoO₃, Grams |  |  | 0.5 |  |
| Cr₂O₃, Grams | 0.5 | 0.5 |  |  |
| MoS₂, Grams |  |  |  | 0.5 |
| Percent Solids | 35.3 | 39 | 39 | 39 |
| Temperature of Fusion, °F | 560 | 560 | 560 | 560 |
| Remarks | (²) | (²) | (²) | (²) |

[1] 30 percent by weight of polychlorotrifluoroethylene; Brookfield viscosity about 10,000 centipoises.
[2] Good adhesion of film. Film shows no evidence of degradation and has good flow properties.

Although the experiments of Examples 6, 7, 8 and 9 employ the technique whereby the stabilizer is introduced in an intermediate coat, equally satisfactory results can be obtained by introducing the stabilizer directly into the primer coating composition before applying to the substrate.

Any of the other metal oxide frits previously mentioned and any of the other high molecular weight halogenated olefin polymers previously described, particularly tetrafluoroethylene polymers can be substituted for the metal oxide frits and perchlorofluorinated olefin polymers employed in the above examples to give coatings having strong adhesion to substrates and a high degree of chemical resistance.

The invention herein described relates to a primer coating composition comprising a volatile liquid dispersion vehicle, a polymer of a halogen-containing olefin, particularly a perfluorohalogenated olefin polymer and a metal oxide frit of a metal above the fourth group of the Periodic Table having a boiling point between 600° C. and 1500° C. The resulting dispersion is fused and cured on a substrate to give a strongly adhesive and chemically resistant coating thereon. The method for preparing the primer coating compositions of this invention may be any of the methods or any of the various modifications and alternatives of the procedure herein described and may become apparent to those skilled in the art without departing from the scope of this invention.

Having thus described my invention I claim:

1. A composition comprising a volatile organic dispersing vehicle, a solid perfluorohaloolefin polymer selected from the group consisting of chlorotrifluoroethylene homopolymer, chlorotrifluoroethylene - vinylidene fluoride copolymer, and perfluoropropene - vinylidene fluoride copolymer, and a cobaltous oxide frit, said composition containing between about 5 and about 60 parts by weight of cobaltous oxide frit per 100 parts by weight of perfluorohaloolefin polymer.

2. The composition of claim 1 wherein the normally solid perfluorohaloolefin polymer is a homopolymer of chlorotrifluoroethylene.

3. The composition of claim 1 wherein the normally solid perfluorohaloolefin polymer is the copolymer of chlorotrifluoroethylene and vinylidene fluoride having between 20 and 69 mole percent of chlorotrifluoroethylene.

4. The composition of claim 1 wherein the normally solid perfluorohaloolefin polymer is the copolymer of chlorotrifluoroethylene and vinylidene fluoride having above about 70 and below 100 mole percent of chlorotrifluoroethylene.

5. The composition of claim 1 wherein the normally solid perfluorohaloolefin polymer is the copolymer of perfluoropropene and vinylidene fluoride.

6. The composition of claim 1 wherein the volatile organic vehicle is amyl acetate.

7. The composition of claim 1 wherein the volatile organic vehicle is xylene.

8. The composition of claim 1 wherein the volatile organic vehicle is a mixture of diisobutyl ketone and xylene.

9. A primer coating composition comprising a volatile organic dispersing vehicle, 100 parts by weight of a solid perfluorohaloolefin polymer selected from the group consisting of chlorotrifluoroethylene homopolymer, chlorotrifluoroethylene-vinylidene fluoride copolymer and perfluoropropene-vinylidene fluoride copolymer between about 5 and about 60 parts by weight of a cobaltous oxide frit and between about 0.1 and about 5 parts by weight of a polymer stabilizer.

10. The primer of claim 9 wherein the stabilizer is molybdenum trioxide.

11. The primer of claim 9 wherein the stabilizer is chromic oxide.

12. The primer of claim 9 wherein the stabilizer is molybdenum sulfide.

13. An article of manufacture which comprises a substrate and a coating thereon comprising 100 parts by weight of fused solid perfluorohaloolefin polymer selected from the group consisting of chlorotrifluoroethylene homopolymer, chlorotrifluoroethylene-vinylidene fluoride copolymer and perfluoropropene-vinylidene fluoride copolymer, and between about 5 and about 60 parts by weight of a cobaltous oxide frit.

14. The article of claim 13 wherein the substrate is metal.

15. An article of manufacture which comprises a substrate, and an intermediate adhesive coating of between about 2 and about 6 mils thickness comprising 100 parts by weight of a fused solid perfluorohaloolefin polymer selected from the group consisting of chlorotrifluoroethylene homopolymer, chlorotrifluoroethylene-vinylidene fluoride copolymer, and perfluoropropene-vinylidene fluoride copolymer, and between about 5 and about 60 parts by weight of a cabaltous oxide, and an outer protective coating comprising a normally solid polymer of a perfluorohaloolefin.

16. An article of manufacture which comprises a metal substrate, an intermediate adhesive coating of between about 2 and 6 mils thickness comprising 100 parts by weight of a fused solid high molecular weight homopolymer of chlorotrifluoroethylene, between about 1 and about 40 parts by weight of a low molecular weight polymer of chlorotrifluoroethylene, and between about 5 and about 60 parts by weight of a cobaltous oxide frit, and an outer protective coating comprising a polymer of chlorotrifluoroethylene.

17. The article of claim 16 wherein the cobaltous oxide frit is produced by fusing cobaltous oxide and an alkaline borosilicate glass.

18. A process which comprises (1) applying to a substrate a coating composition comprising a volatile organic dispersing vehicle, 100 parts by weight of a solid perfluorohaloolefin polymer selected from the group consisting of chlortrifluoroethylene homopolymer, chlorotrifluoroethylene-vinylidene fluoride copolymer and perfluoropropene-vinylidene fluoride copolymer, and between about 5 and about 60 parts by weight of a cobaltous oxide, and (2) heating said coating composition to a temperature between about 350° F. and about 600° F. to provide a fused adherent coating on the surface of the substrate.

19. A process which comprises (1) applying to a metal a coating composition comprising a volatile organic dispersing vehicle, 100 parts by weight of a solid perfluorohaloolefin polymer selected from the group consisting of chlorotrifluoroethylene homopolymer, chlorotrifluoroethylene-vinylidene fluoride copolymer and perfluoropropene-vinylidene fluoride copolymer, and between about 5 and about 60 parts by weight of a cobaltous oxide, (2) heating said coating composition to a temperature between about 350° F. and about 600° F. to provide a fused adherent coating surface on the substrate, (3) applying thereon a coating of a solid perfluorohaloolefin polymer having a molecular weight above 50,000, and (4) curing the entire coating at a temperature between about 350° F. and about 600° F.

References Cited in the file of this patent

UNITED STATES PATENTS

| | | |
|---|---|---|
| 2,392,388 | Joyce | Jan. 8, 1946 |
| 2,495,630 | Dorst | Jan. 24, 1950 |
| 2,562,118 | Osdal | July 24, 1951 |
| 2,567,162 | Sanders | Sept. 4, 1951 |
| 2,592,147 | Ikeda | Apr. 8, 1952 |
| 2,619,443 | Robinson | Nov. 25, 1952 |
| 2,638,523 | Rubin | May 12, 1953 |
| 2,686,738 | Teeters | Aug. 17, 1954 |
| 2,707,703 | Dorst | May 3, 1955 |
| 2,737,505 | Finholt | Mar. 6, 1956 |
| 2,789,959 | Smith | Apr. 23, 1957 |
| 2,834,993 | Dipner | May 20, 1958 |
| 2,874,143 | Barnhart et al. | Feb. 17, 1959 |
| 2,874,198 | Barnhart et al. | Feb. 17, 1959 |